(12) United States Patent
Foley et al.

(10) Patent No.: US 7,708,810 B2
(45) Date of Patent: May 4, 2010

(54) CARBON NANOCOMPOSITE MEMBRANES AND METHODS FOR THEIR FABRICATION

(75) Inventors: Henry C. Foley, University Park, PA (US); Ramakrishnan Rajagopalan, State College, PA (US); Anna R. Merritt, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 864 days.

(21) Appl. No.: 11/458,182

(22) Filed: Jul. 18, 2006

(65) Prior Publication Data

US 2007/0017861 A1    Jan. 25, 2007

Related U.S. Application Data

(60) Provisional application No. 60/700,608, filed on Jul. 19, 2005.

(51) Int. Cl.
*B01D 53/22* (2006.01)
*B01D 71/02* (2006.01)
*B01D 71/06* (2006.01)
*B01D 69/12* (2006.01)

(52) U.S. Cl. .......... 96/4; 96/10; 96/11; 96/13; 96/14; 95/45; 95/50; 95/54; 95/55; 95/903; 55/524; 55/DIG. 5; 264/29.1; 264/29.5; 264/29.7; 210/640; 210/650; 210/500.21; 210/500.27

(58) Field of Classification Search ............ 96/4, 96/10, 11, 13, 14; 95/45, 50, 54, 55, 903; 55/524, DIG. 5; 264/29.1, 29.5, 29.7; 210/640, 210/650, 500.21, 500.27
See application file for complete search history.

(56) References Cited

U.S. PATENT DOCUMENTS

| 5,104,425 | A | | 4/1992 | Rao et al. | |
|---|---|---|---|---|---|
| 5,354,547 | A | | 10/1994 | Rao et al. | |
| 5,431,864 | A | | 7/1995 | Rao et al. | |
| 5,810,912 | A | * | 9/1998 | Akiyama et al. | 96/11 |
| 6,471,745 | B1 | * | 10/2002 | Foley et al. | 96/11 |
| 6,730,364 | B2 | * | 5/2004 | Hong et al. | 96/11 |
| 6,740,143 | B2 | * | 5/2004 | Corbin et al. | 96/11 |
| 6,818,133 | B1 | * | 11/2004 | Wolter et al. | 95/45 |
| 7,264,650 | B2 | * | 9/2007 | Lou et al. | 95/54 |
| 7,404,844 | B2 | * | 7/2008 | Tin et al. | 96/4 |
| 7,510,595 | B2 | * | 3/2009 | Freeman et al. | 95/45 |

* cited by examiner

Primary Examiner—Jason M Greene
(74) Attorney, Agent, or Firm—Gifford, Krass, Sprinkle, Anderson & Citkowski, P.C.

(57) ABSTRACT

A gas permeable, carbon based, nanocomposite membrane comprises a nanoporous carbon matrix comprising a pyrolyzed polymer, and a plurality of nanoparticles of carbon or an inorganic compound disposed in the matrix. The matrix is prepared by pyrolyzing a polymer, and nanoparticles of the particulate material are disposed in the polymer prior to pyrolysis. The particles may be disposed in a precursor of the polymer, which precursor is subsequently polymerized, or in the polymer itself.

15 Claims, 1 Drawing Sheet

CARBON NANOCOMPOSITE MEMBRANES AND METHODS FOR THEIR FABRICATION

RELATED APPLICATION

This application claims priority of U.S. Provisional Patent Application Ser. No. 60/700,608 filed Jul. 19, 2005, entitled "Carbon Nanocomposite Membranes and Methods for Their Fabrication."

FIELD OF THE INVENTION

This invention relates generally to materials and methods for their fabrication. More specifically, the invention relates to methods for fabricating carbon based membranes having nanoparticles dispersed therein, Most specifically, the invention relates to membranes and methods for their fabrication wherein the membranes are useful as molecular sieves, catalysts, and the like, and comprise carbon based membranes having nanoparticles of inorganic materials dispersed therein.

BACKGROUND OF THE INVENTION

Nanoporous carbon membranes are known in the art. These membranes comprise films of carbon, or carbon based materials, having a pore structure in the nanoscale range. As is understood herein, a nanoscale range generally refers to features on the submicron scale. As is known in the art, nanoporous, carbon based membranes are fabricated by pyrolyzing appropriate organic materials, typically polymers, in a non-oxidizing atmosphere. The resultant membranes are comprised entirely, or primarily, of carbon and manifest an active surface and a controlled pore structure. Typically, such membranes are prepared upon a support member such as a body of stainless steel. Membranes of this type are disclosed, for example, in U.S. Pat. Nos. 5,104,425; 5,354,547 and 5,431,864.

Nanoporous carbon membranes have been found to have utility as molecular sieves. Owing to their controlled pore size, these membranes effectively allow for the separation or enrichment of composite gas mixtures. Nanoporous membranes are also employed in chemical reactors and in catalytic systems.

One problem that has plagued prior art nanoporous carbon membranes is the fact that their coefficient of thermal expansion frequently differs from that of a substrate upon which they are disposed. Furthermore, the carbon itself tends to be relatively brittle; hence, thermal cycling can cause cracking of these membranes. Also, in some instances, gas permeability of these membranes is undesirably low thereby limiting their utility.

As will be explained in detail hereinbelow, the present invention provides for improved nanoporous carbon membranes, and specific methods for their manufacture. The membranes of the present invention incorporate nanoscale particulate matter therein, and the presence of this material tends to relieve stresses in the membrane and hence reduces cracking during thermal cycling. Furthermore, the presence of the particulate material enhances the gas permeability of these membranes. In some instances, the particulate material may be chosen so as to actively enhance the chemical, physical or catalytic effects of the membrane material. These and other advantages will be apparent from the discussion hereinbelow.

SUMMARY OF THE INVENTION

Disclosed herein is a method for making a gas permeable, carbon based, nanocomposite membrane. According to the method, a precursor of particulate material is provided, and this precursor is reacted so as to yield the particulate material. A polymerizable organic material is provided and polymerized to produce a polymer. The particles are added to either the polymer or the polymerizable organic material; and in either instance, the foregoing method steps result in the ultimate production of a polymeric material which includes the particles therein. The particle-containing polymer is pyrolyzed so as to yield a body of carbon having said particles of an inorganic material disposed therein.

In some instances, the precursor of the particulate material comprises a hydrolyzable compound, and the step of reacting that material comprises hydrolyzing the compound so as to produce the inorganic material. In some instances, the hydrolyzable compound is an alkoxide of an inorganic element. In particular instances, the inorganic material includes a compound of one or more of Si, Al, Ti, Zr, and Fe. This compound may comprise an oxide, a carbide, a nitride, an oxycarbide, or an oxynitride. In other instances, the particulate material is carbon, and the precursor may be a hydrocarbon gas or the like. In particular instances, the inorganic material is in the form of nanoparticles, and in specific instances, these nanoparticles have a size in the range of 10-500 nanometers.

The polymerizable organic material may comprise an alcohol such as furfuryl alcohol, or other types of polymers such as phenolic resins.

In some instances, the particles are prepared in a first series of steps, and subsequently added to the polymer or to the polymerizable organic material in a second step. In other instances, the precursor of the particulate material is added to either the polymerizable organic material or to the polymer and subsequently reacted to yield the particles, in which instance the step of reacting the precursor of the particulate material so as to yield the particles also comprises the step of adding the particles to the polymer or to the polymerizable material.

In some instances, the polymer is cast onto a substrate prior to the step of pyrolyzing. In such instance, the polymer may contain the particles prior to casting, or the particles may be first disposed upon the substrate, and the polymer cast thereonto. In some instances, plural layers of polymer are cast onto a substrate. Pyrolysis may take place separately for each cast layer, or pyrolysis may take place after all of the sublayers have been cast.

Also disclosed herein are membranes produced according to the foregoing methods.

DETAILED DESCRIPTION OF THE MENTION

Figure 1:
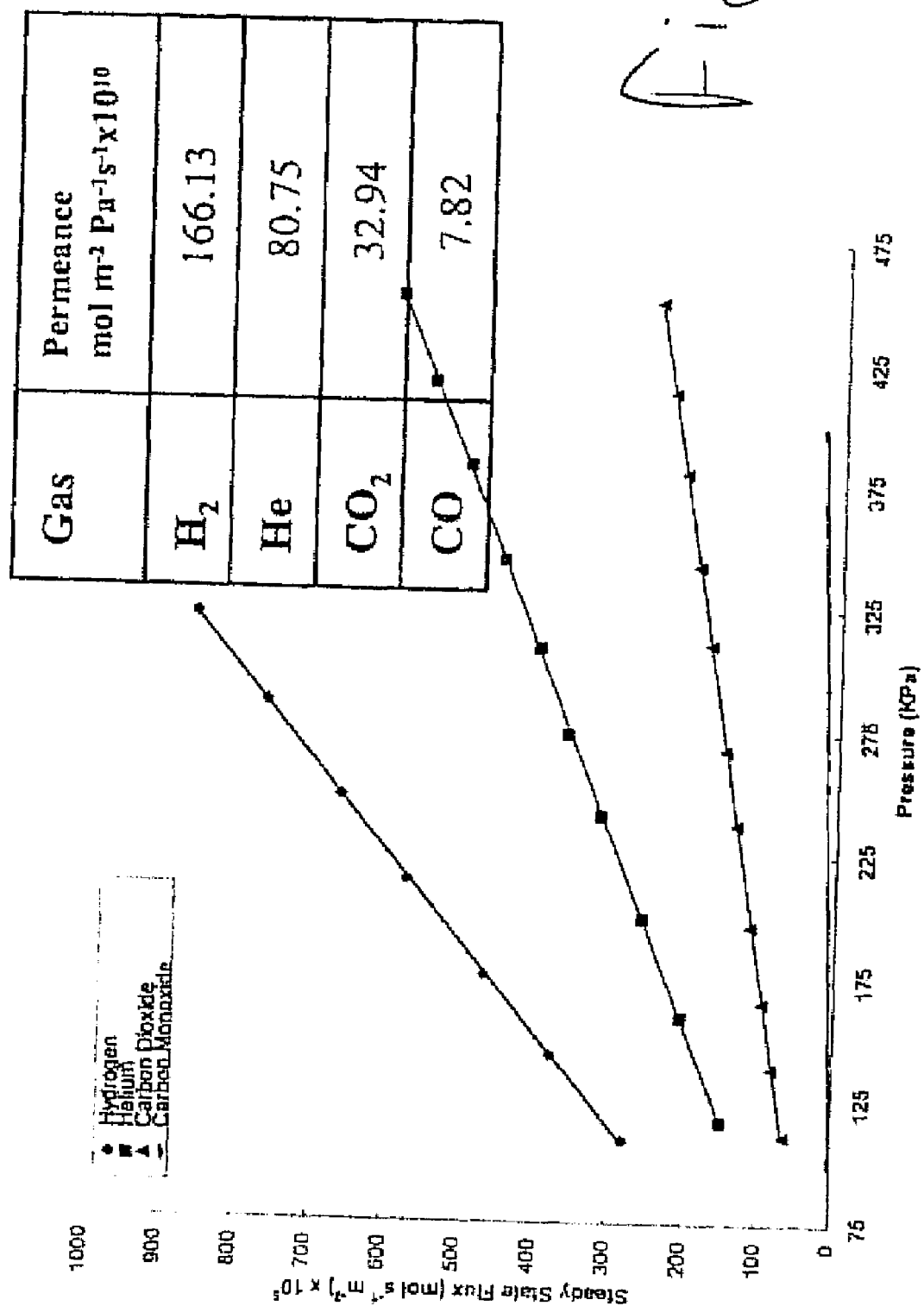
FIG. 1 is a graph plotting steady state flux versus driving force pressure for a membrane of the present invention, and this figure further includes an inset giving gas permeances of the membrane for the listed gases.

The membranes of the present invention comprise a carbon matrix formed from a pyrolyzed polymer. A plurality of nanoparticles are disposed in the matrix. The nanoparticles may be symmetrically dispersed throughout the thickness of the matrix, or they may be asymmetrically disposed so as to be more concentrated in one portion of the thickness. The nanoparticles typically have a size of less than 1 micron, and in particular instances have a size of less than 500 nanometers. In some particular instances, the particles have a size in the range of 10-50 nanometers. The particles generally comprise, on a weight basis, 0.1-5.0 percent by weight of the membrane. In particular instances, the particles comprise 0.2-0.6 percent of the membrane, and in one particular instance, the particles comprise approximately 0.5 percent of the membrane.

The particles may comprise various inorganic materials such as oxides, nitrides, carbides, oxynitrides, oxycarbides, and combinations of the foregoing. In particular instances, the material comprises a compound of Si, Al, Ti, Zr, and Fe, taken either singly or in combination. In particular instances, the particles comprise oxides, and in one specific instance the particles comprise silica. In other instances, the particles may comprise carbon, and in that regard they may comprise lampblack, amorphous carbons, tetrahedral carbon, graphite, and various graphenes such as fullerenes, nanotubes and the like. As mentioned above, the presence of the particles enhances the gas permeability of the resultant membrane. Furthermore, the particles enhance the strength of the membranes and improve resistance to damage by thermal cycling.

The carbon matrix is formed by pyrolysis of a pyrolyzable material such as a polymer. There are a variety of polymers known in the art which can be pyrolyzed to produce nanoporous carbon. One such polymer comprises polyfurfuryl alcohol. Other polymeric materials including polymers such as phenolics, polyvinylidene chloride, polyimides and cellulose may also be utilized, as may be non-polymeric materials such as sucrose.

In a general process for fabricating membranes of the present invention, nanosized particles are utilized. These particles are typically prepared by a chemical reaction process utilizing a precursor material. In one group of reactions particles are inorganic, and the precursor is a hydrolyzable material such as an alkoxide, and this material is hydrolyzed by contact with a proton source, such as water and/or alcohol, and as is known in the art, the hydrolysis is typically facilitated by inclusion of an acid or a base in the reaction mixture. The thus obtained inorganic material is mixed with either a polymer or a polymer precursor. In some instances, the precursor of the inorganic material may be mixed into the polymer precursor, and subsequently reacted to produce the particles, either in a step implemented before the polymerization or in a step implemented thereafter. In other instances, the preformed particles are introduced to the polymer or polymer precursor.

In other instances, the particles comprise carbon, and the precursor material comprises a hydrocarbon or other carbon-containing species such as a carbohydrate. The carbon nanoparticles may be prepared in a separate step from the remainder of the process, or they may be generated in situo, as for example by pyrolysis of a carbohydrate or the like. In any instance, the particles of carbon used in this group of embodiments are to be distinguished from the nanoporous matrix of the material, since they represent distinct particles defining discontinuities in the matrix.

In any instance, the result of the foregoing is a composite material comprising a polymer having the particles (or particle precursors) dispersed therethrough. This polymer is then pyrolyzed to produce the membrane material of the present invention. Pyrolysis is typically carried out in a non-oxidizing atmosphere such as an atmosphere or argon or some other inert gas, or in an atmosphere of a non-reactive, non-oxidizing gas such as nitrogen or carbon dioxide.

Typically, the membrane material is coated onto a substrate prior to pyrolysis so as to produce a supported membrane. Substrates can comprise a metal such as stainless steel, and the substrates may, in some instances, be porous. In those instances where the membrane is being prepared on a substrate, the particles may be predisposed in the polymer prior to coating; alternatively, the particles may first be precoated onto the substrate, and the polymer thereafter coated onto the substrate so as to produce an asymmetric membrane structure in which the particle concentration is greater at the interface of the membrane material and the substrate than at the free surface of the membrane.

In particular instances, the membrane is built up by sequentially coating and pyrolyzing multiple layers of the polymer material. In other instances, the membrane may be prepared and pyrolyzed as a single layer. In yet other instances, bulk polymeric material may be pyrolyzed to produce a granular or other microscopic form of the material which may have utility as a catalytic material, column packing, reactor bed or the like.

The present invention will be described with one particular protocol for the preparation of a membrane, it being understood that other methods and materials may be adapted to the preparation of various membranes of the present invention.

In this particular instance, a membrane comprising a nanoporous carbon body having silica nanoparticles therein was fabricated. The silica nanoparticles used in this synthesis were prepared via a sol-gel process utilizing tetraethylorthosilicate (TEOS, 98% Aldrich Chemical) as a precursor of the silica particles. This material was hydrolyzed utilizing a mixture of ammonium hydroxide, methanol and furfuryl alcohol (FA, 99% Aldrich Chemical) and distilled water. This mixture was stirred for two hours and resulted in the formation of silica nanospheres. The solution was placed under vacuum overnight to remove excess methanol, ammonia and water.

Thereafter, an excess of furfuryl alcohol was added to the evaporated solution along with a surfactant (Triton X-100) and the solution was acid polymerized using para-toluenesulfonic acid monohydrate (p-TSA, 98.5% Sigma Aldrich).

Thereafter, the polymerized, silica-containing, material was cast into membranes and subsequently pyrolyzed. In this example, substrates comprising porous 316L stainless steel disks having an area of 14.7 $cm^2$ and an average pore size of 0.2 microns were employed. These membranes were obtained from Chand Eisenmann Metallurgical Inc. The polymerized material was diluted to 20% by weight in acetone and spin coated onto the substrates. (Other coating techniques such as spray-coating, dip-coating, and the like could also be employed.) The polymer membrane was then pyrolyzed under argon at a temperature of 600° C. to form a carbon membrane. The coating process and pyrolysis were repeated until a selective membrane was formed.

A comparable technique was used to prepare prior art, silica nanoparticle-free, prior art porous carbon membranes. In one instance, the membranes were prepared from polymerized furfuryl alcohol synthesized in accord with the foregoing acid catalyzed procedure, to produce particle-free, pure carbon membranes. The same membrane procedures were carried out with commercially available polyfurfuryl alcohol (Durez resin) to produce particle-free membranes. Properties of the various membranes were then analyzed and compared.

The size of the silica nanospheres in the membranes of the present invention was determined by light scattering using a He—Ne laser operating at 633 nm. Further analyses were carried out utilizing scanning and transmission electron microscopy. It was found that particle size depended upon the concentration of the various components of the hydrolysis solution. In general, it was found that the nanoparticle size of the silica increases as the amount of ammonium hydroxide (base catalyst) and the amount of furfuryl alcohol increases. Likewise, particle size was found to increase as the concentration of TEOS was increased. Table 1 reproduced hereinbelow details this variation, and it will be apparent therefrom that the size of the nanoparticles may be controlled by appropriately controlling solution concentrations.

TABLE 1

Variation of silica nanoparticle size with synthesis conditions.

| FA | Methanol | TEOS | % Volume NH$_4$OH in Water | Particle Size |
|---|---|---|---|---|
| 0 | 10 mL | 0.2 mL | 5 mL of 16.67% | 37 nm |
| 0 | 10 mL | 0.2 mL | 5 mL of 33.33% | 110 nm |
| 2 mL | 8 mL | 0.2 mL | 5 mL of 33.33% | 255 nm |
| 4 mL | 6 mL | 0.2 mL | 5 mL of 33.33% | 319 nm |
| 6 mL | 4 mL | 0.2 mL | 5 mL of 33.33% | 365 nm |

SEM and TEM techniques confirm that the size and shape of the nanoparticles did not vary subsequent to evaporation and pyrolysis. In the foregoing experimental series, the concentration of silica nanoparticles in the resultant carbon membrane was determined by the mole balance of silicon atoms. It is assumed that the density of silica is 1.9 g/cm$^3$ and that all of the TEOS reacts to form silica. Based upon these assumptions, the membranes prepared in this experimental series contain approximately 0.48% by weight of silica. It is to be understood that by appropriate choice of the amounts of reagents utilized, membranes having other concentrations of nanoparticles may be prepared.

Permeances of gases through the membranes were studied utilizing a permeation testing unit of the type known in the prior art, details of which are to be found in a publication of Acharya and Foley, AICHE Journal, 46, 911 (2000), the disclosure of which is incorporated herein by reference. Details of this evaluation of permeances are found in Table 2 hereinbelow.

TABLE 2

Comparison of oxygen and nitrogen single gas permeances.

| Membrane Material | Permeance (mol m$^{-2}$ Pa$^{-1}$s$^{-1}$ × 10$^{10}$) | | Ideal Selectivity O$_2$/N$_2$ | # of Coats | Weight Addition |
|---|---|---|---|---|---|
| | Oxygen | Nitrogen | | | |
| Silica-Carbon | 15.71 | 2.84 | 5.53 | 4 | 38.1 mg |
| Pure Carbon | 3.85 | 1.22 | 3.16 | 8-10 | 65.9 mg |
| Durez Carbon | 0.31 | 0.053 | 5.85 | 8-10 | 72.5 mg |

It was found that the gas permeances through the silica-carbon membrane are nearly two orders of magnitude greater than they are for the commercially derived Durez resin and four times greater than that for the carbon derived from the in-house synthesized PFA resin. It was also noted that the number of coats of resin required to make a selective membrane (O$_2$/N$_2$ approximately 5.5) was 4 coats for the silica-carbon material while it was 8-10 coats for pure carbon membranes. The total mass of the silica-carbon deposited on the stainless steel support was roughly half that of the pure carbon. This indicates that the silica-carbon membranes are much thinner than the pure carbon membranes. This demonstrates that the composition of the present invention is very efficient in forming gas permeable selective membranes, as compared to prior art materials. This allows thinner membranes to be prepared which enhances gas permeability while also economizing on the cost of membrane material. Permeances for helium, hydrogen, carbon dioxide and carbon monoxide were also measured in the silica-carbon membrane. FIG. 1 summarizes the single gas permeances through the membrane of the present invention.

It was found that gas permeances for all gases in the silica-carbon membrane were significantly higher than for prior art carbon membranes. The ideal selectivity for H$_2$/CO and H$_2$/CO$_2$ were 21.2 and 5.04 respectively. O$_2$/N$_2$ selectivity is a very stringent measurement for the use of membranes in catalysis and separations. It has previously been shown that catalysis and selective transport can be performed in membranes with only moderate O$_2$/N$_2$ selectivities. And, selective hydrogenation of monoolefins, and thermal decomposition of methyl tert-butyl ether have been performed on membranes with O$_2$/N$_2$ selectivities of 3-5. In view thereof, it is clear that the membranes of the present invention are very well suited for applications involving catalytic membrane reaction due to their good O$_2$/N$_2$ selectivity and high gas throughput.

In another group of experiments, membranes of the present invention were prepared using lampblack (carbon) particles having a size of approximately 200 nanometers. These particles were first deposited onto porous, stainless steel substrates of the type described above. Polyfurfuryl alcohol solutions were then coated onto the substrates and pyrolyzed in a manner generally similar to the aforedescribed. This resulted in the production of a membrane comprised of a nanoporous carbon matrix having discrete carbon particles dispersed therein. Furthermore, the distribution of the particles was asymmetric, insofar as particle concentration was highest proximate the substrate.

While the foregoing was primarily directed to membranes including silica or carbon nanoparticles therein, the techniques disclosed herein can be readily adapted to the fabrication of membranes having other nanoparticles therein. For example, particles based upon oxides of aluminum, titanium, zirconium and iron, as well as other metals, can be easily prepared by hydrolysis techniques as described above. Also, techniques including sol-gel techniques and/or conversion reactions are well known in the art for the fabrication of nanoparticles comprising other ceramic type materials such as carbides, nitrides, carbonitrides, oxynitrides and the like are well known in the prior art and can be adapted for the practice of the present invention. In some instances, a mixture of particles of different formulations may be incorporated into a single membrane. It will be understood that by the appropriate choice of particle material, selectivity and reactivity of the membranes may be controlled.

While the foregoing examples describe the use of polyfurfuryl alcohol as the source of porous carbon, other polymeric and non-polymeric materials are known in the art which are capable of being used as a carbon source. Such other materials include, by way of illustration and not limitation, phenolics, polyvinylidene halides, polyimides, cellulose, and sucrose.

In view of the foregoing, it is to be understood that the discussion, description and examples presented herein are illustrative of specific embodiments of the invention, but are not meant to be limitations upon the practice thereof. It is the following claims, including all equivalents, which define the scope of the invention.

The invention claimed is:

1. A method of making a gas permeable, carbon based, nanocomposite membrane, said method comprising the steps of:
   providing a precursor which can be reacted to produce silica;
   reacting said precursor so as to yield said silica;
   providing a polymerizable organic material;
   polymerizing said polymerizable organic material so as to produce a polymer;
   adding said silica to either of said polymer or said polymerizable organic material; and pyrolyzing said polymer having said silica dispersed therein so as to yield a body of carbon having said silica disposed therein.

2. The method of claim 1, wherein said precursor of said silica comprises a hydrolyzable compound, and the step of reacting said precursor comprises hydrolyzing said compound so as to produce said silica.

3. The method of claim 2, wherein said hydrolyzable compound is an alkoxide of silica.

4. The method of claim 1, wherein said silica is in the form of nanopartieles.

5. The method of claim 1, wherein said silica has a particle size in the range of 10-500 nanometers.

6. The method of claim 1, wherein said polymerizable organic material comprises an alcohol.

7. The method of claim 6, wherein said alcohol is furfuryl alcohol.

8. The method of claim 1, wherein said step of reacting said precursor is carried out in a reaction mixture which includes said polymerizable organic material, and wherein said step of polymerizing said polymerizable organic material is carried out after the step of reacting said precursor.

9. The method of claim 1 including the further step of casting said polymer into a membrane prior to the step of pyrolyzing said polymer.

10. The method of claim 9, wherein the step of casting said polymer into a membrane comprises casting said polymer onto a substrate.

11. The method of claim 10, wherein said silica is added to said polymer before it is cast onto said substrate.

12. The method of claim 10, wherein said silica is disposed on said substrate before said polymer is cast thereonto.

13. The method of claim 1, wherein the step of pyrolyzing said polymer comprises heating said polymer in an inert atmosphere to a temperature of at least 500° C.

14. The method of claim 1, wherein the step of polymerizing said polymer comprises casting a first layer of said polymer onto a substrate, polymerizing said first layer, casting a second layer of said polymer onto said first layer after it has been pyrolyzed, and thereafter pyrolyzing said second layer of said polymer.

15. A method of making a gas permeable, carbon based, nanocomposite membrane, said method comprising the steps of:

providing a precursor of a particulate material, which particulate material comprises silica or carbon;

reacting said precursor so as to yield said particulate material;

providing a polymerizable organic material;

polymerizing said polymerizable organic material so as to produce a polymer;

adding said particulate material to either of said polymer or said polymerizable organic material; and pyrolyzing said polymer having said particulate material dispersed therein so as to yield a body of carbon having said particulate material disposed therein.

\* \* \* \* \*

UNITED STATES PATENT AND TRADEMARK OFFICE
CERTIFICATE OF CORRECTION

| | | |
|---|---|---|
| PATENT NO. | : 7,708,810 B2 | Page 1 of 1 |
| APPLICATION NO. | : 11/458182 | |
| DATED | : May 4, 2010 | |
| INVENTOR(S) | : Henry C. Foley et al. | |

It is certified that error appears in the above-identified patent and that said Letters Patent is hereby corrected as shown below:

Col. 1 lines 3-4, following the title add the following heading and paragraph:

STATEMENT OF GOVERNMENT SUPPORT

This invention was made with government support under Grant No. DMR0103585, awarded by the National Science Foundation. The Government has certain rights in the invention.

Signed and Sealed this
Twenty-seventh Day of March, 2012

David J. Kappos
*Director of the United States Patent and Trademark Office*